United States Patent

[11] 3,532,100

[72] Inventors: Peter Arthur Ward Hilton; John Albert Mullins, Chellaston; Geoffrey William Morris, Breaston, England
[21] Appl. No.: 796,505
[22] Filed: Feb. 4, 1969
Division of Ser. No. 717,266, Mar. 29, 1968, abandoned
[45] Patented: Oct. 6, 1970
[73] Assignee: Rolls-Royce Limited, Derby, England, a British company
[32] Priority: Apr. 5, 1967
[33] Great Britain
[31] 15,602/67

[54] SILENCING OF GAS TURBINE ENGINES
1 Claim, 1 Drawing Fig.

[52] U.S. Cl. ................................................. 137/15.1
[51] Int. Cl. ................................................ F02k 11/00
[50] Field of Search ...................................... 137/15.1, 15.2; 181/33.21

[56] References Cited
FOREIGN PATENTS
921,127  3/1963  Great Britain ............ 181/33.21

Primary Examiner—Alan Cohan
Attorney—Cushman, Darby and Cushman

ABSTRACT: A gas turbine jet propulsion engine air intake provided with flaps or the like whereby the intake cross sectional area may be selectively reduced to a value which causes the ingoing air to reach sonic velocity, thus effectively providing a block against egress of noise from the engine compressor. The engine air intake further provides for the discharge of air to atmosphere when the cross sectional area of the intake has been selectively reduced.

Patented Oct. 6, 1970
3,532,100
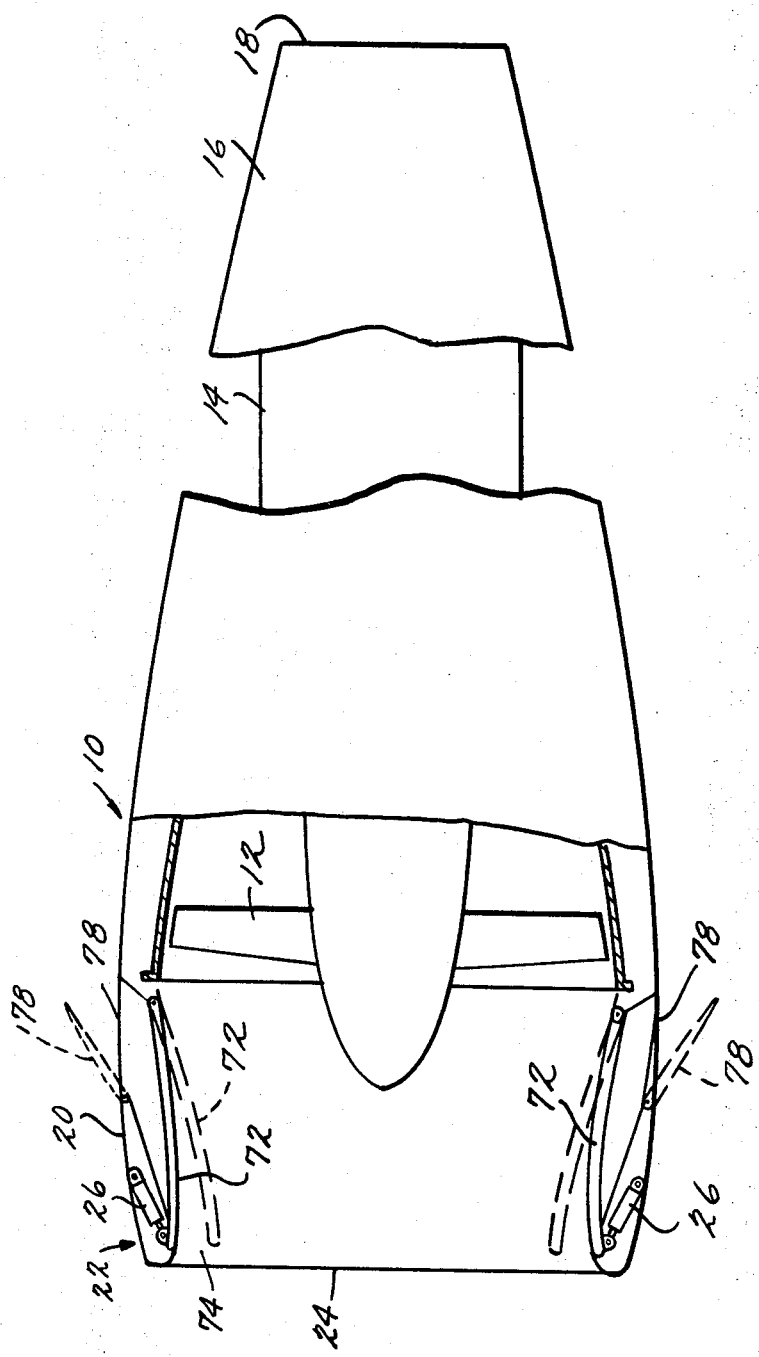
INVENTORS
PETER ARTHUR WARD
JOHN ALBERT MULLINS
GEOFFREY WILLIAM MORRIS
BY Cushman, Darby & Cushman
ATTORNEYS

SILENCING OF GAS TURBINE ENGINES

SPECIFICATION

This application is a division of our co-pending U.S. application Ser. No. 717,266, filed March 29, 1968 now abandoned.

The present invention relates to the silencing of gas turbine engines and, more particularly, to an improved gas turbine jet propulsion air intake which may be selectively reduced in cross-sectional area to improve the silencing of such engines during aircraft approach and landing as well as while the aircraft is taxiing on the ground.

Considerable engine noise, which may for instance be produced in part by the engine compressor means, normally escapes through the air intake of a gas turbine engine. This engine noise usually predominates at low engine thrust because of reduced jet noise, for example, during taxiing or landing of the aircraft powered by gas turbine engines.

Although low thrust intake noise is on a lower level than high thrust jet noise at a common distance from the engine, this difference is largely offset by lower aircraft altitude on approach than takeoff at a given distance from the end of the runway.

According to the present invention, there is provided a gas turbine engine having a casing defining an air intake passage which casing is provided with at least one movable member, means for effecting movement of said member into and out of a position in which it projects into the passage, the movable member when in said position effecting choking of the passage to prevent or reduce engine noise passing therethrough in an upstream direction.

According to another feature of the present invention, there may be a plurality of movable members which are arranged in spaced apart relationship around the intake so that they are movable into and out of a position to effect choking of the intake, the movable members when out of said position forming part of said casing. When the movable members are in said position air enters between said members and said casing, which air is discharged to atmosphere.

The air is preferably discharged to atmosphere through ducts in said casing, closure means being provided for said ducts, means being provided for opening said closure means when said movable members are moved to said position.

It will be appreciated that the movable members referred to above may be actuated in any convenient manner, for example hydraulic rams or screw jacks may be used.

Throughout this specification the term "choked" is intended to refer to the condition which occurs when the flow through an orifice is at sonic velocity whereby noise generated on the downstream side of the orifice can no longer be transmitted upstream thereof.

The present invention provides means for resisting the egress of noise from the compressor through the air intake and will now be described with reference to the drawing in which a diagrammatic sectional view of a gas turbine engine embodying the improved air intake of the present invention is disclosed.

In the drawing a gas turbine jet propulsion engine generally designated at 10 includes compressor means 12, combustion means 14, turbine means 16 and a propelling nozzle 18 in flow series. A casing 20 for the engine 10 extends forwardly of the compressor means 12 and forms or defines an air intake 22 for the compressor means 12. The air intake 22 is divergent as it extends from the inlet orifice 24 to the face of the compressor means 14.

A plurality of pivotal members 72 are mounted in the air intake 22 so as to be selectively movable between a position in which they form a continuation of the air intake's inner wall and a further position in which they project into the passage defined by the air intake so as to reduce the cross-sectional area of the intake orifice 24. Any suitable means such as hydraulic rams, screw jacks, or the like shown diagrammatically at 26 may be used to actuate the pivotal members 72 selectively between the aforementioned positions. When the pivotal members 72 are moved to the dotted line position where the cross-sectional area of the intake orifice 24 is reduced, the gas turbine engine 18, which still requires the same amount of air as was required before having its intake area reduced, sucks in the same amount of air through the smaller diameter intake orifice thereby increasing the velocity of the air in the orifice up to sonic speed. The result of such increase in velocity of the air substantially reduces the amount or level of noise emitted from the compressor through the air intake.

When the pivotal members 72 are moved to the position shown by the dotted lines, thus reducing the inlet orifice area 24, an annular gap 74 is defined between the outer surface of the member 72 and the casing. Air which enters the annular gap 74 is discharged to atmosphere through ducts 76 extending through the casing and terminating on the outer surface of the casing. Each duct 76 is provided with a closure flap 78 which is adapted, by means not shown, to move between the full line position and the broken line open position when the pivotal members 72 are moved to the broken line position.

The operation of the gas turbine engine may be briefly described as follows. During cruising flight and takeoff of an aircraft incorporating the air intake 22 of the present invention, the pivotal members 72 and the flaps 78 remain in the full line position so that the inlet orifice area 24 is sufficient to permit the required mass flow of air for takeoff and cruise. However, during landing of the aircraft, the pivotal members 72 and flaps 78 are moved to the broken line position and the inlet orifice area 24 is reduced. At the same time the engine rotational speed is reduced thereby reducing the mass flow of air required by the engine to a predetermined value. By choking the inlet orifice, the mass flow of air required by the engine at the predetermined value is increased in velocity up to sonic speed thereby reducing the egress of noise emitted from the compressor means through the air intake.

We claim:

1. A gas turbine jet propulsion engine air intake having inner and outer walls, a first set of flaps mounted on, and forming a part of its inner wall and a second set of flaps mounted on, and forming part of its outer wall, said first and second sets being substantially radially aligned, the upstream end of the first set being pivotable towards the intake axis and the downstream ends of the second set being pivotable away from the intake axis, the two sets being adapted to pivot in unison so as to provide thereby at least one aperture wherethrough intake air is redirected to atmosphere before reaching the engine.